United States Patent [19]

Mongillo

[11] 4,050,675
[45] Sept. 27, 1977

[54] BATTERY WEDGE FOR SUBMARINES OR OTHER INSTALLATIONS

[75] Inventor: Adolph V. Mongillo, New Haven, Conn.

[73] Assignee: The United States of America as represented by the Secretary of the Navy, Washington, D.C.

[21] Appl. No.: 729,921

[22] Filed: Oct. 6, 1976

[51] Int. Cl. ............................................. B66f 11/00
[52] U.S. Cl. .................................................. 254/104
[58] Field of Search ................ 254/104; 248/23, 188.2

[56] References Cited

U.S. PATENT DOCUMENTS

| | | | |
|---|---|---|---|
| 1,499,560 | 7/1924 | Stangeland | 254/104 |
| 2,164,615 | 7/1939 | Mafera | 254/104 |
| 3,239,218 | 3/1966 | Reeves | 254/104 |

Primary Examiner—Robert C. Watson
Attorney, Agent, or Firm—R. S. Sciascia; L. I. Shrago; C. E. Vautrain, Jr.

[57] ABSTRACT

A wedge assembly for spacing apart batteries which permits a complete range of operation with all components remaining intact in their assembled form is provided. A central or inner wedge having a plurality of identical wedge sections is movable between a pair of outer wedges or side plates having mating inner sections and a planar outer surface. Wedging action is produced by torquing a bolt secured to the outer wedges and threaded through a nut secured in the inner wedge. The wedging components are held together and in alignment by screws attached to the inner wedge and guided through slots formed in the outer wedges.

3 Claims, 17 Drawing Figures

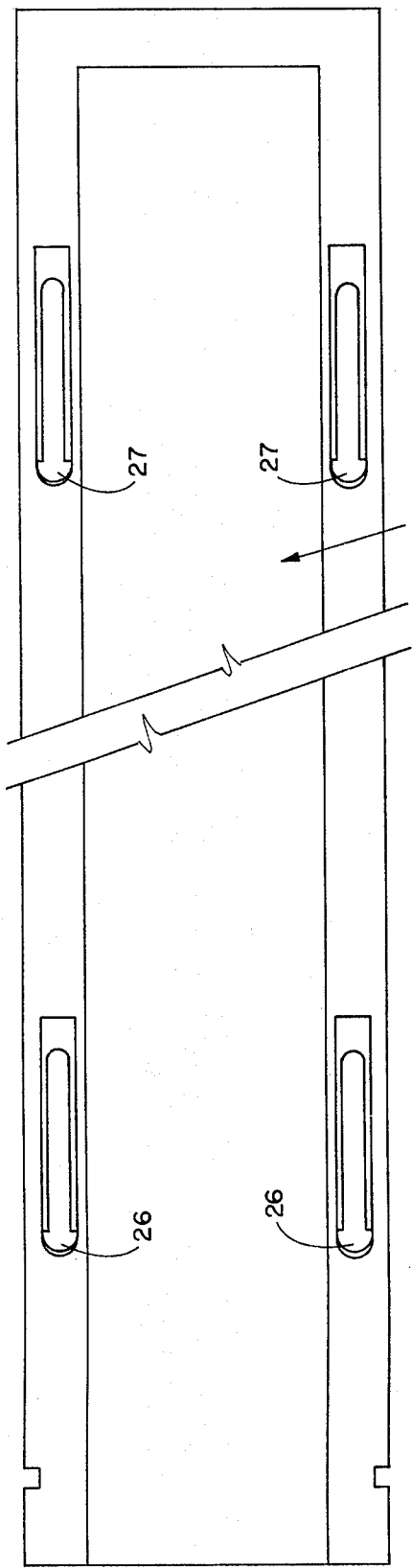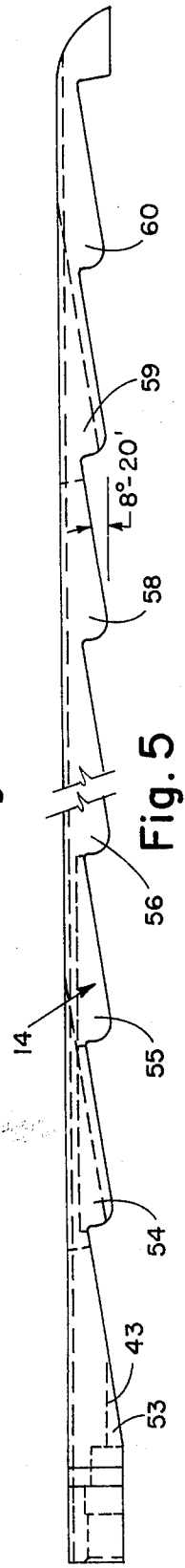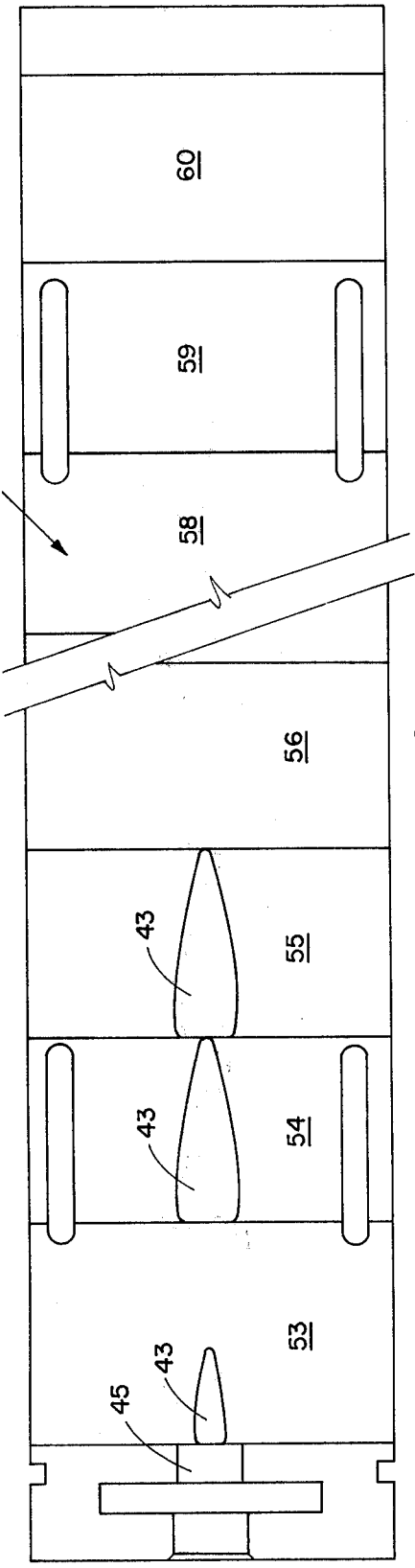

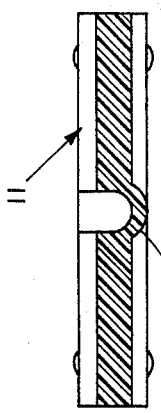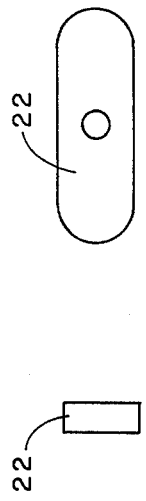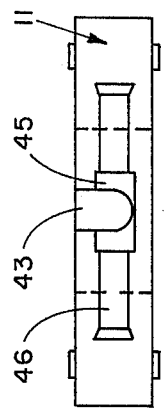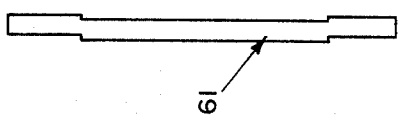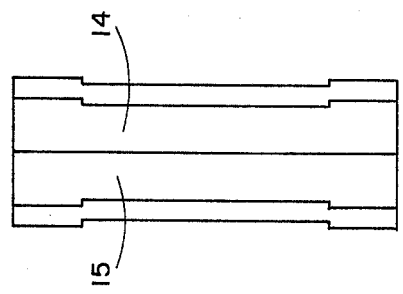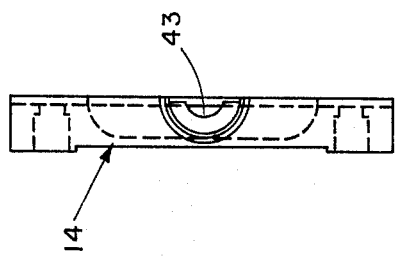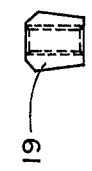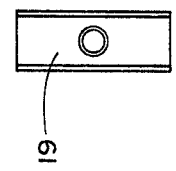

BATTERY WEDGE FOR SUBMARINES OR OTHER INSTALLATIONS

This invention concerns securing a battery in place in a battery bank or tray and, more particularly, means for securing batteries rapidly and with provisions for tightening and loosening which facilitate the positioning and removal of the batteries.

Currently batteries or cells in battery banks on submarines and other vessels or in other installations are secured by forcing two complementary wedges together side-by-side by hammering the tapered wedges. The wedges conventionally are made of maple and since they are hammered in place between batteries or between and the walls of an enclosure, no control is possible over the precise amount of force applied to the side of a battery or to limiting the pressure of each wedge pair to specific areas on the side of a battery. Such lack of control can easily lead to excessive force being applied in installing the wedges resulting in excessive pressure being applied to various areas of the battery, causing breakage in the case of battery jars and deformation in the case of resilient battery walls made of rubber or plastic. If the wedges are so thick so as to cause such excessive pressure, either one of the wedges must be removed so that excess surface material may be shaved off and/or the projecting edge of the wedge cut so as to not extend beyond the battery wall. Fitting such wedges with the proper sideways force and in the desired areas of the battery walls is both time consuming and possibly destructive both at installation and upon removal of the battery. Also, numerous thicknesses of wedges must be available to allow a selection of those which will fill the desired spacing within allowable tolerances. In large banks of batteries such as on submarines, filling the spacing between rows of cells is essential and filling the spacing between groups of cells on the order of two or three is also essential. Thus, in the installation of a considerable number of cells a great amount of time and a large number of wedges of various thicknesses are required to permit the necessary wedging to be accomplished. Since it is usually necessary to install both horizontally disposed and vertically disposed wedges, the time and number of wedges required are unfortunately lengthened commensurately. The present invention avoids these and other deficiencies of present means for securing battery cells by providing a combination of wedging surfaces and complementary side walls which are adjusted within specific spacing limits by the relative movement of either the central or the opposed side wedging components with respect to the other.

Accordingly, it is an object of the present invention to provide battery wedging means with controlled transverse spacing so as to permit rapid installation and removal of batteries without the use of destructive force.

Another object of this invention is to provide battery spacing means which are moved relative to one another to provide adjustable spacing without requiring hammering or other poorly controlled force applications.

A further object of this invention is to provide a battery wedging means in which the force required to provide desired spacing is closely controlled and the size of the wedging means is variable within any desired limits.

Other objects, advantages and novel features of the present invention will become apparent from the following detailed description thereof when considered in conjunction with the accompanying drawings in which like numerals represent like parts throughout and wherein:

FIG. 5 is a plan view of one of the outer wedge components of the assembly of FIGS. 1 and 2;

FIG. 6 is a side view of the inner surface of the outer wedge component of FIG. 5;

FIG. 7 is a side view of the outer surface of the component of FIG. 5;

FIG. 9 is a cross section of the central wedge member of FIG. 3 taken along a line substantially corresponding to line 9—9 in that figure;

FIG. 10 is an end view of the inner wedge member of FIG. 3;

FIG. 11 is an end view of the end of the embodiments of FIGS. 1 and 2 opposite the operative means therein;

FIG. 12 is an end view of a thrust plate for use in spacing apart the components of FIGS. 1 and 2;

FIG. 13 is a side view of the thrust plate of FIG. 12;

FIG. 14 is an end view of the nut used in spacing the components of the embodiment of FIGS. 1 and 2;

FIG. 15 is a side view of the nut of FIG. 14;

FIG. 16 is an end view of the spacer element shown in FIG. 8; and

FIG. 17 is an end view of the side component shown in FIG. 5 at the end where force is applied to produce spacing.

The present invention, in general, comprises a wedge assembly having mating mechanical wedges each of which includes a plurality of tapered wedge sections which are moved relative to one another to the extent necessary to fill a gap. The central wedging component is powered longitudinally with respect to the fixed mating outside components to provide for expansion or contraction of the assembly. The overall length of the assembly remains constant and the abutting surfaces may be made to conform to a desired surface of the objects to be wedged in place.

Figure 2:
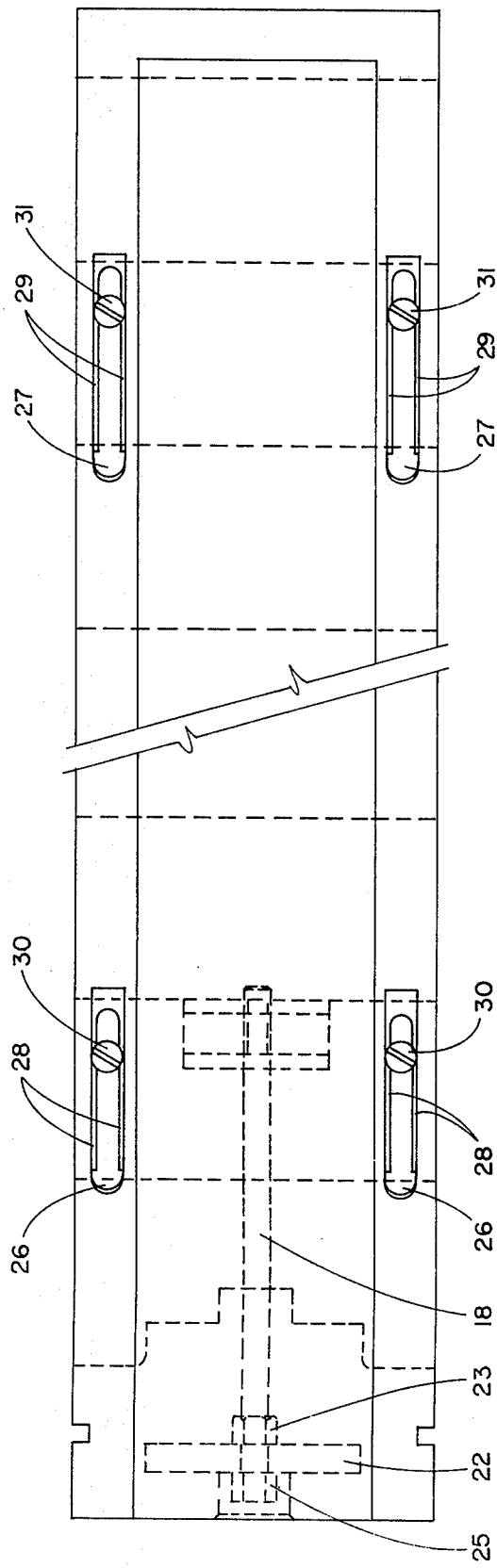
FIG. 2 is a side view of the wedge-spacing assembly of FIG. 1.
Figure 1:
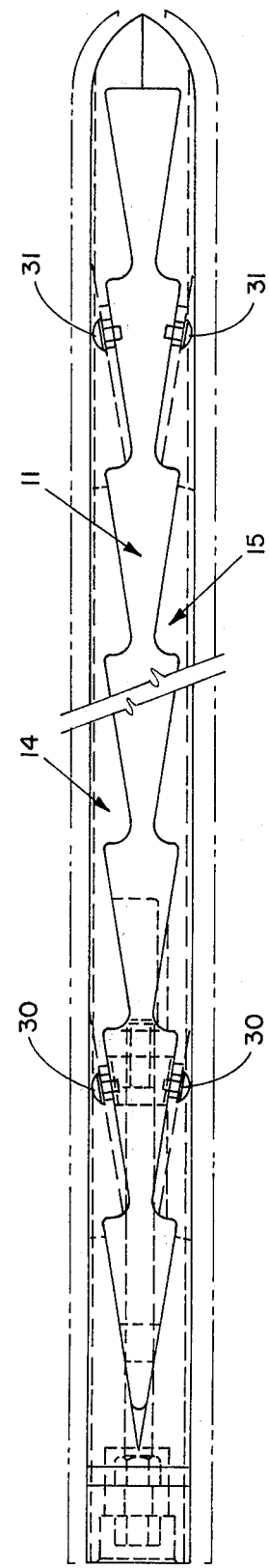
FIG. 1 is a plan view of one embodiment of the wedge-spacing components of the present invention assembled together in operative form.
Figure 4:
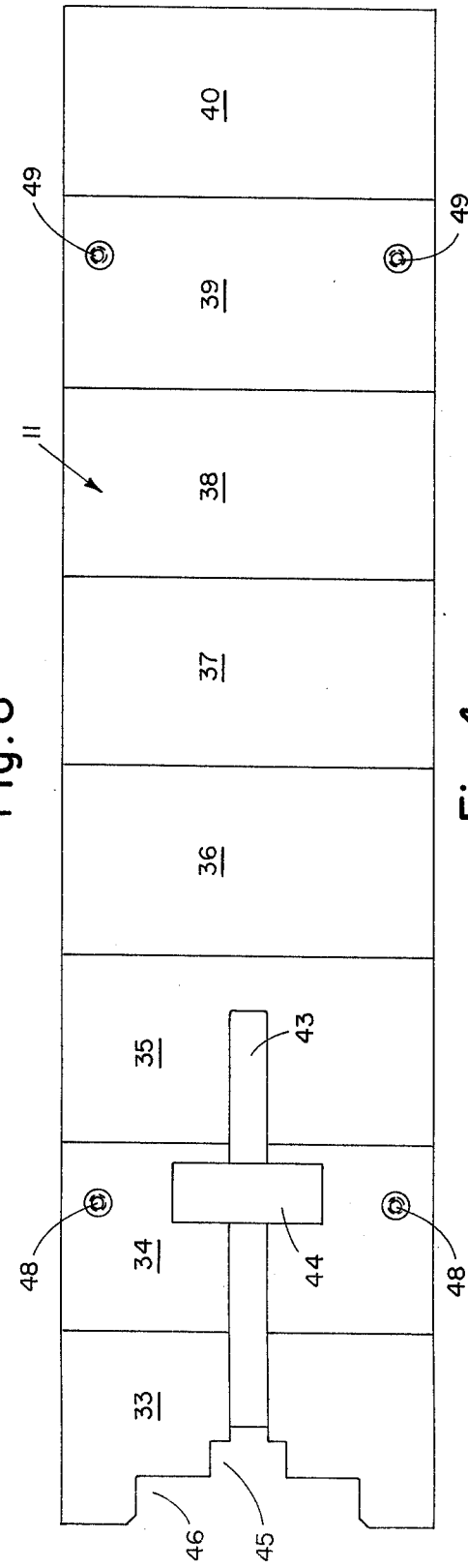
FIG. 4 is a side view of the wedge member of FIG. 3.
Figure 3:
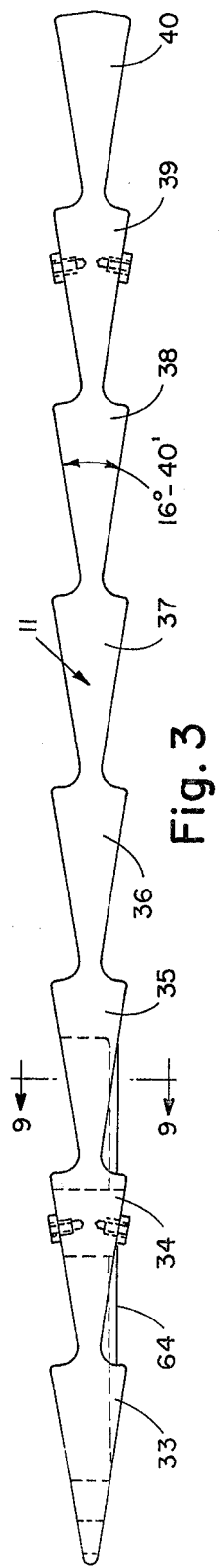
FIG. 3 is a plan view of the central wedge member of the assembly of FIGS. 1 and 2.

Referring to the drawings, FIGS. 1 and 2 are external views of an assembly of mating wedge components which includes an inner, symmetrically formed wedge 11 and a pair of mating outer wedges 14 and 15 which are oppositely formed. The inner and outer wedges are provided with recesses at one end for accommodating a bolt 18, an interior nut 19, a thrust plate 22, a locking nut 23, and a bolt head 25. These recesses are shown in greater detail in FIGS. 4, 10 and 17. The movement of inner wedge 11 with respect to outer wedges 14 and 15 is guided by at least two pairs of slots 26 and 27 in the outer wedges which are widely spaced apart and include respective flanged surfaces 28 and 29 which accommodate the heads of screws 30 and 31 which are secured to inner wedge 11. FIG. 3 shows inner wedge 11 removed from the assembly and having a plurality of symmetrically opposed wedge sections 33–40 while FIG. 4 is a side view of one operative surface of inner wedge 11 and shows a plurality of recesses 43–46 for receiving, respectively, bolt 18, nut 19, locking nut 23 and thrust plate 22. Also shown are the holes 48 and 49 for receiving screws 30 and 31, respectively.

Figure 8:
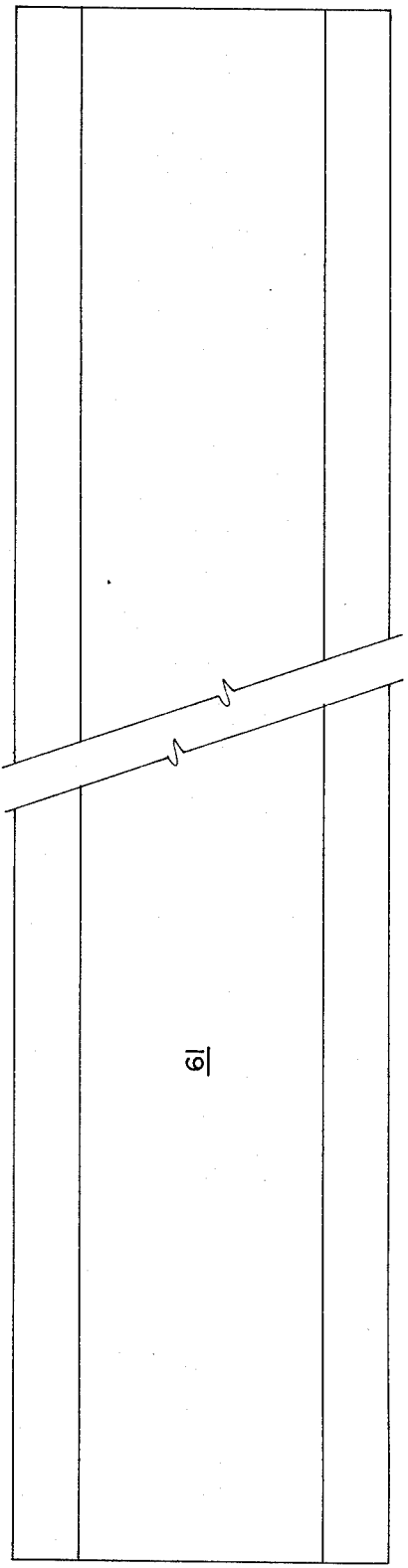
FIG. 8 is a side view of a spacer element for use in spaces which are larger than the extended width of the assembly of FIGS. 1 and 2.

FIGS. 5–7 show one of the outer wedges 14 and 15 in detail with FIG. 5, the plan view, illustrating wedge sections 53–60 which mate with wedge sections 33–40 of inner wedge 11, FIG. 6 the interior surface of outer wedge 14, and FIG. 7 the exterior, planar outer surface of outer wedge 14. FIG. 8 is a side view of a spacer 61 for partially filling spaces which are greater than the extended width of the wedge assembly of FIGS. 1 and 2.

FIG. 9 is a cross section of inner wedge member 11 taken along a line substantially corresponding to line 9—9 in FIG. 3. The elements of the assembly, other than the hardware items, are preferably made of plastic. This permits inner wedge 11 to be curved as indicated at 64 to accommodate bolt 18. FIG. 10 is an end view of inner wedge member 11 showing recesses 43, 45 and 46, while FIG. 11 is an end view of the assembly of FIG. 2 taken from the closed end remote from the end having the recesses for operation of the device. FIGS. 12 and 13 show the thrust plate in side and end views, FIGS. 14 and 15 show interior nut 19 in side and end views, FIG. 16 is an end view of spacer 61 and may be added to either side of the assembly to partially fill a gap.

FIG. 17 is an end view of outer wedge 14 and 15.

In a preferred embodiment, the mechanical wedge of the present invention comprises bolt 18 installed in the multiple wedge assembly shown in FIGS. 1 and 2 with inner wedge 11 preferably 5 inches wide, 20 inches long, and 1 inch thick tapering to ¼ inch thick between tapered sections. Mating outside wedges 14 and 15 remain fixed relative to each other while inner wedge 11 is powered in or out for expansion or contraction by turning bolt 18 through nut 19. The overall length of the assembly remains constant during expansion or contraction while the bolt powers the wedge assembly to a desired sideways force and thickness to fill the gap. Bolt 18 preferably is made of non-corrosive metal and the inner and outer wedges preferably are made of plastic. Thrust plate 19 may be 1 inch × 3 inches × ⅜ inch and bolt 18 may be 6 inches long depending upon the angle of taper of the wedge surfaces. This taper angle preferably is 8°–20′ for each individual surface or, as indicated in FIG. 3, the composite angle of two complementary wedge surfaces is 16°–40′. The curve of inner wedge 11 indicated at 64 conforms to the size of bolt used and provides strengthening in this area of the inner wedge.

The wedge is generally inserted horizontally between two adjacent battery jars or other form of battery container wall preferably against mating projecting surfaces thereof. Bolt 18 is torqued clockwise forcing the inner wedge to slide to the left in FIGS. 1 and 2, and in so doing, outer wedges 14 and 15 are forced against the respective battery walls. The plurality of bearing surfaces provided by inner sections 33–40 and mating outer sections 53–60, and the minimum wall thickness of the outer wedges or side plates, assure a uniformly distributed application of force over as large an area as desired. This force is produced by a precise, predetermined amount of torque applied preferably to a torque wrench to bolt head 25. The wedge assembly may be removed or repositioned simply by torquing bolt 18 counterclockwise the required amount.

The invention permits tightening and loosening of the wedges between a battery or group of batteries without requiring the removal of adjacent batteries. Wedge assemblies may also be used in a vertical attitude to supply a separation force in selected areas between individual battery cells or between rows of battery cells, and amoung other uses, the wedge assembly of the invention may be placed at the base of batteries to move the batteries horizontally into or out of position. The amount of spacing provided by each individual or group of wedge assemblies is determined by the wedge angle and the thicknesses of the inner and outer wedges. A single wedge assembly may be constructed to cover all or substantially all of the side walls of a battery and may have several bolts for drawing the inner wedge toward the operative end of the assembly. A suitable space is provided opposite the operative end of inner wedge 11 in each assembly to accommodate its maximum movement in a particular configuration. Opposing wedge surfaces may be forced along one another for substantially their entire length as indicated by the length of slots 26 and 27.

The fastener arrangement holding the assembly together allows a complete range of operation with all components remaining intact in their assembled form. All of the material used in making the various components is non-corrosive and highly resistant to impairment by battery acid. Obviously many modifications and variations of the invention are possible in the light of the above teachings.

What is claimed is:

1. In a wedge device for spacing apart or elevating or lowering objects wherein a central member is movable with respect to adjoining outer members and all components are required to be contained entirely within the envelope formed by the outer surfaces of said outer members the improvement comprising:
    a linear succession of dual-faced oppositely-angled wedge sections in said central member,
    the inner surfaces of said outer members mating with the adjoining surfaces of said central member when in the initial condition;
    a bolt interconnecting said central and outer members and disposed in selectively extensive recesses therein,
    a nut anchored in a recess in said central member and said bolt threaded through said nut and having its head received in recesses in said outer members,
    a thrust plate anchored in said outer members and positioned in recesses therein immediately forward of the interior face of said bolt head,
    said bolt extending from a position within the end of said device toward which said wedge sections taper substantially thereinto so as to power said central member from at least the next to the end wedge section thereof; and
    spaced guide and restraining means secured two each symmetrically to said section containing said nut and a section remotely spaced therefrom and a like number of slots conforming to said guide and restraining members formed in said outer members,
    whereby all operative components are contained within the outer configuration of said device permitting unrestricted placement thereof and both expansion and contraction of said outer members by operation of said bolt.

2. The device as defined in claim 1 wherein in the initial condition the ends of said outer members remote from said bolt head abut and are contoured to facilitate insertion of said device between two closely spaced objects.

3. The device as defined in claim 2 wherein the angled surfaces of said wedge sections taper toward said bolt head at an angle of substantially 8°-20' with respect to a plane longitudinally bisecting said wedge sections to permit operation of said device against friction between selectively wide adjacent tapered surfaces of said central and outer members.

* * * * *